(12) United States Patent
Wang et al.

(10) Patent No.: US 11,924,144 B2
(45) Date of Patent: *Mar. 5, 2024

(54) METHOD AND APPARATUS FOR CONFIGURING AGGREGATE MAXIMUM BIT RATE

(71) Applicant: Samsung Electronics Co., Ltd., Suwon-si (KR)

(72) Inventors: Hong Wang, Beijing (CN); Lixiang Xu, Beijing (CN); Huarui Liang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 1148 days.

This patent is subject to a terminal disclaimer.

(21) Appl. No.: 16/673,676

(22) Filed: Nov. 4, 2019

(65) Prior Publication Data

US 2020/0067689 A1 Feb. 27, 2020

Related U.S. Application Data

(63) Continuation of application No. 15/785,230, filed on Oct. 16, 2017, now Pat. No. 10,469,238, which is a (Continued)

(30) Foreign Application Priority Data

Dec. 18, 2012 (CN) .......................... 201210552063.9

(51) Int. Cl.
*H04L 5/00* (2006.01)
*H04W 28/22* (2009.01)

(52) U.S. Cl.
CPC ........... *H04L 5/0096* (2013.01); *H04W 28/22* (2013.01)

(58) Field of Classification Search
CPC ............................. H04L 5/0096; H04W 28/22
See application file for complete search history.

(56) References Cited

U.S. PATENT DOCUMENTS 8,566,455 B1* 10/2013 Zhao ................. H04W 36/0016
709/227
8,761,091 B2* 6/2014 Zisimopoulos ....... H04W 72/54
370/338

(Continued)

FOREIGN PATENT DOCUMENTS

CN 101325805 A 12/2008
CN 101534532 A 9/2009

(Continued)

OTHER PUBLICATIONS

Office Action dated Jun. 3, 2021, from the China National Intellectual Property Administration, in connection with a counterpart Chinese Application No. 201910662375.7, 9 pages.

(Continued)

*Primary Examiner* — Lonnie V Sweet (57) ABSTRACT

A system for configuring a UE-AMBR includes a MME to send the UE-AMBR to an eNB covering the serving cell of the UE, the eNB covering the serving cell of the UE establishes a radio access bearer of the UE on at least one secondary cell. The MME sends an AMBR of the UE in the primary eNB covering the serving cell of the UE and an AMBR of the UE in a secondary eNB to the primary eNB. The primary eNB sends the AMBR of the secondary eNB to the corresponding secondary eNB. The technical solutions of the present disclosure can make total rate of all non-GBR services of the UE be not larger than the UE-AMBR when the UE has multiple S1 bearers or one S1 bearer.

28 Claims, 7 Drawing Sheets

Related U.S. Application Data continuation of application No. 14/133,428, filed on Dec. 18, 2013, now Pat. No. 9,794,047.

(56) References Cited

U.S. PATENT DOCUMENTS

| | | | |
|---|---|---|---|
| 9,444,745 B2* | 9/2016 | Blankenship | H04W 76/16 |
| 9,794,047 B2* | 10/2017 | Wang | H04L 5/0096 |
| 10,728,882 B2* | 7/2020 | Wang | H04L 5/0092 |
| 2009/0052384 A1 | 2/2009 | Zisimopoulous et al. | |
| 2009/0225719 A1 | 9/2009 | Zhi et al. | |
| 2009/0245108 A1* | 10/2009 | Wu | H04L 47/29 |
| | | | 370/233 |
| 2010/0284278 A1 | 11/2010 | Alanara | |
| 2011/0002306 A1 | 1/2011 | Liu | |
| 2011/0038322 A1 | 2/2011 | Liang | |
| 2011/0058521 A1* | 3/2011 | Xu | H04W 8/20 |
| | | | 370/328 |
| 2011/0080870 A1* | 4/2011 | Bhalla | H04W 24/02 |
| | | | 370/328 |
| 2011/0116478 A1* | 5/2011 | Zhang | H04W 36/0055 |
| | | | 370/331 |
| 2012/0224564 A1 | 9/2012 | Paisal et al. | |
| 2012/0302240 A1 | 11/2012 | Tamaki et al. | |
| 2013/0040683 A1* | 2/2013 | Siomina | H04W 24/08 |
| | | | 455/517 |
| 2013/0188527 A1* | 7/2013 | Yang | H04W 8/18 |
| | | | 370/259 |
| 2013/0272247 A1* | 10/2013 | Guo | H04W 76/12 |
| | | | 370/328 |
| 2013/0308606 A1* | 11/2013 | Xu | H04L 63/101 |
| | | | 370/331 |
| 2014/0003297 A1 | 1/2014 | Uusitalo et al. | |
| 2014/0003391 A1* | 1/2014 | Vesterinen | H04W 28/14 |
| | | | 370/328 |
| 2014/0043979 A1* | 2/2014 | Etemad | H04W 28/0205 |
| | | | 370/237 |
| 2014/0155062 A1* | 6/2014 | Hahn | H04W 16/06 |
| | | | 455/434 |
| 2014/0169268 A1* | 6/2014 | Hampel | H04W 76/32 |
| | | | 370/328 |
| 2014/0192771 A1 | 7/2014 | Jung et al. | |
| 2014/0219248 A1 | 8/2014 | Reddiboyana et al. | |
| 2014/0293958 A1 | 10/2014 | Teyeb et al. | |
| 2018/0115921 A1* | 4/2018 | Chen | H04W 28/22 |
| 2020/0092753 A1* | 3/2020 | Liu | H04W 28/0867 |

FOREIGN PATENT DOCUMENTS

| | | |
|---|---|---|
| CN | 102696187 A | 9/2012 |
| CN | 103052116 A | 4/2013 |
| EP | 2753035 A2 | 7/2014 |
| JP | 2010-537529 A | 12/2010 |
| KR | 10-2011-0031229 A | 3/2011 |
| KR | 10-2012-0010645 A | 2/2012 |
| RU | 2450485 C2 | 5/2012 |
| WO | 2012127280 A1 | 9/2012 |
| WO | 2013053339 A2 | 4/2013 |
| WO | 2014021763 A2 | 2/2014 |

OTHER PUBLICATIONS

Decision of Patent in connection with Korean Application No. 10-2020-0071045 dated Aug. 17, 2020, 9 pages.

State Intellectual Property Office of P.R. China, "The Second Office Action," Application No. CN20120552063.9, dated Sep. 17, 2018, 14 pages.

Office Action dated Feb. 5, 2018 in connection with Chinese Patent Application No. 201210552063.9.

Decision on Grant dated Jan. 18, 2018 in connection with Russian Patent Application No. 2015123450.

3GPP; "Evolved Universal Terrestrial Radio Access Network" (E-UTRAN); 3GPP TS 36.413 V11.1.0; Release 11; Sep. 2012; 1-131 pp.

3GPP; "Evolved Universal Terrestrial Radio Access Network" (E-UTRAN); 3GPP TS 36.413 V11.1.0; Release 11; Sep. 2012; 132-262 pp.

Nokia Siemens Networks; "eNB Action Upon Receiving UE AMBR During Unsuccessful Operations"; 3GPP TSG-RAN WG3 #72 Meeting; R3-111448; May 9-13, 2011; 2 pp.

International Search Report dated Mar. 27, 2014 in connection with International Patent Application No. PCT/KR2013/011807; 3 pp.

European Patent Office, "Supplementary Search Report and Annex to the European Search Report," Application No. 13866047.7-1851, dated Aug. 16, 2016, 9 pages, publisher EPO, The Hague.

\* cited by examiner

METHOD AND APPARATUS FOR CONFIGURING AGGREGATE MAXIMUM BIT RATE

CROSS-REFERENCE TO RELATED APPLICATIONS

This application is a continuation of application Ser. No. 15/785,230, filed Oct. 16, 2017, which is a continuation of application Ser. No. 14/133,428 filed on Dec. 18, 2013, now U.S. Pat. No. 9,794,047, which claims priority to Chinese Application No. 201210552063.9, filed Dec. 18, 2012, the entire disclosures of which are hereby incorporated by reference.

BACKGROUND

1. Field

The present application relates to wireless communication technology, and more particularly, to a method for configuring Aggregate Maximum Bit Rate (AMBR) of a User Equipment (UE) (UE-AMBR).

2. Description of Related Art

Figure 1:
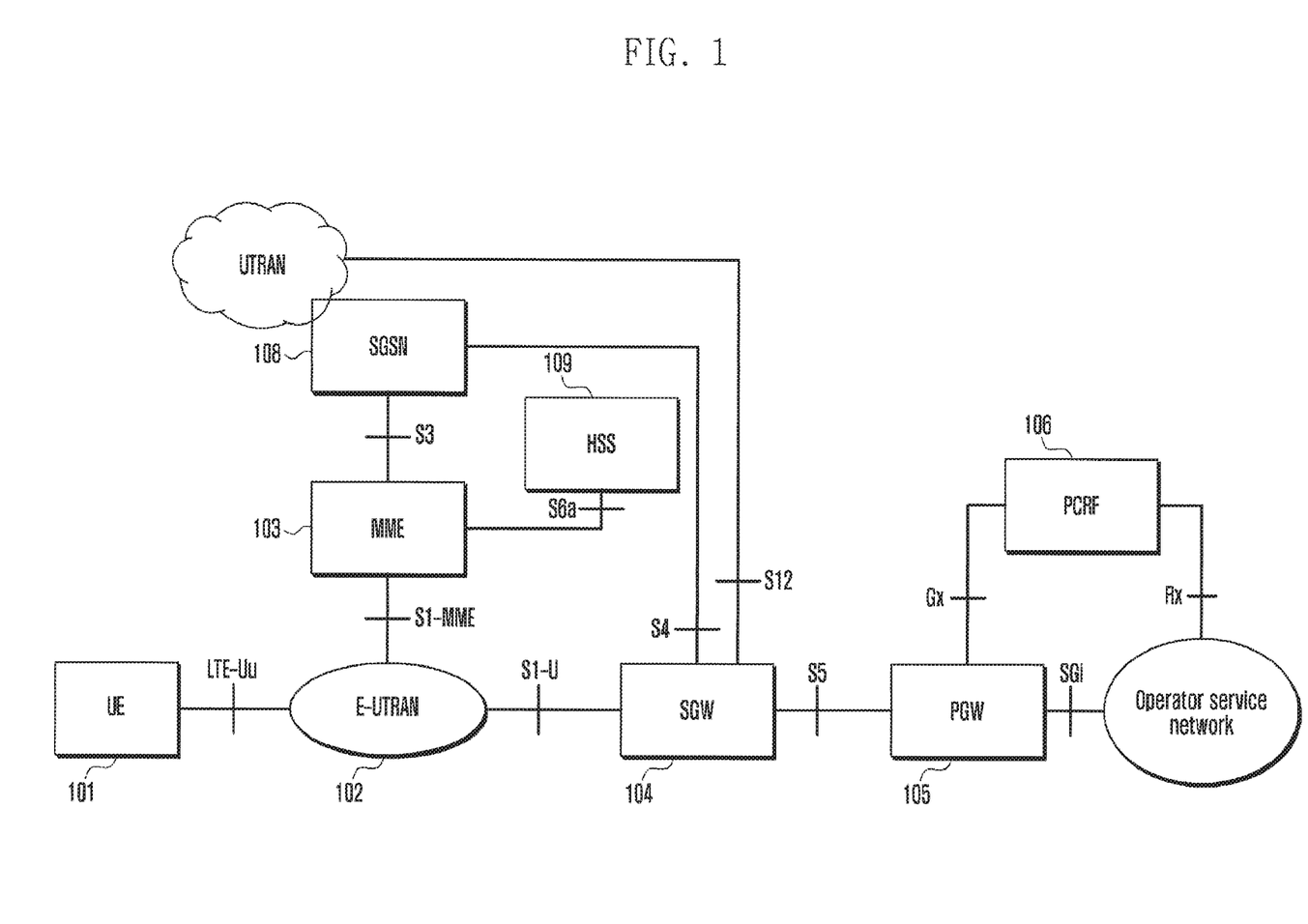
FIG. 1 is a schematic diagram illustrating a system architecture of conventional SAE.

Modern mobile communication technology tends to provide users multimedia service of high-rate transmission. FIG. 1 is a schematic diagram illustrating the structure of a System Architecture Evolution (SAE). In FIG. 1, UE 101 is a terminal device for receiving data. Evolved Universal Terrestrial Radio Access Network (E-UTRAN) 102 is a radio access device, which includes an eNB/NodeB providing a wireless network interface for the UE. Mobility Management Entity (MME) 103 is configured to manage mobile context, session context and security information of the UE. Serving Gateway (SGW) 104 is configured to provide functions of a subscriber plane. MME 103 and SGW 104 can be located in the same physical entity. Packet Data Network Gateway (PGW) 105 is configured to implement charging and legal monitoring functions. PGW 105 and SGW 104 can be located in the same physical entity. Policy and Charging Rules Function Entity (PCRF) 106 is configured to provide Quality of Service (QoS) policies and charging rules. Serving General Packet Radio Service (GPRS) Support Node (SGSN) 108 is a network node device for providing routing for data transmission in a Universal Mobile Telecommunications System (UMTS). Home Subscriber Server (HSS) 109 is a home subsystem of the UE and is configured to protect user information including the current location of the UE, address of a service node, user security information, packet data context of the UE, and so on.

In current Long Term Evolution (LTE) system, each cell supports a maximum bandwidth of 20 MHz. In order to improve the peak rate of a UE, a Carrier Aggregation (CA) technology is introduced in a LTE-advanced system. With the Carrier Aggregation, the UE can simultaneously communicate with cells controlled by the same eNB and work on different carrier frequencies, thus the transmission bandwidth can be up to 100 MHz, the uplink and downlink peak rate of the UE can be multiplied.

Figure 2:
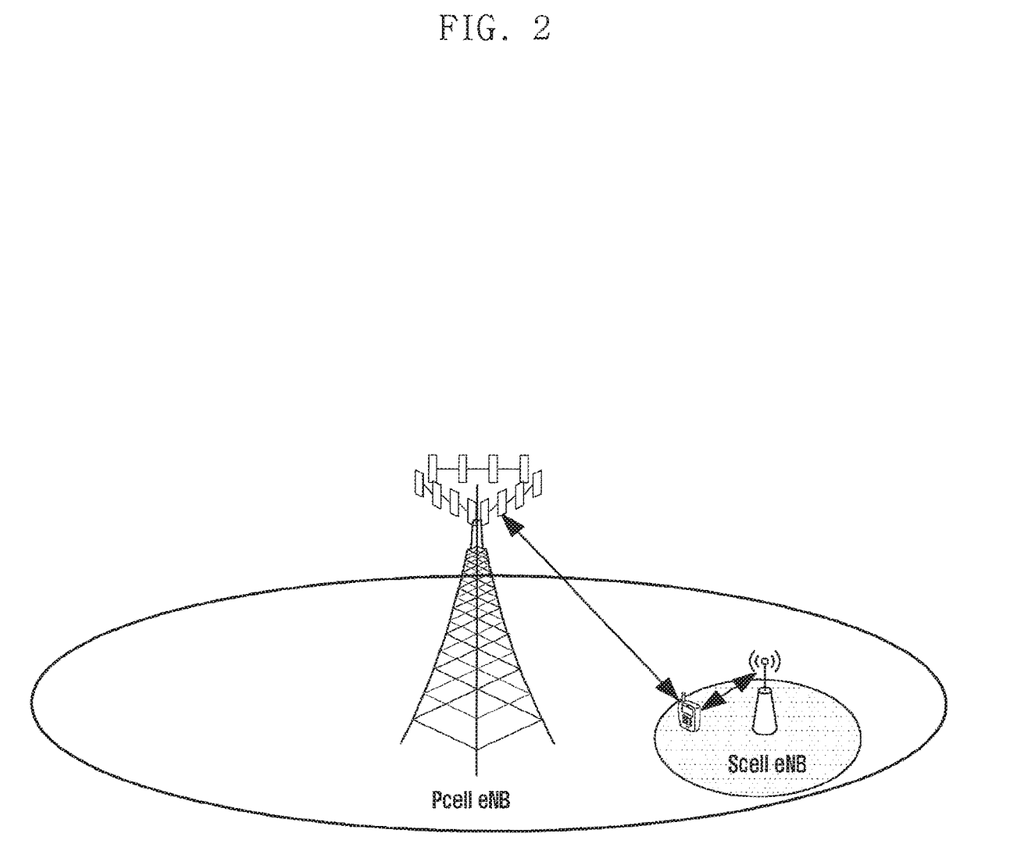
FIG. 2 is a schematic diagram illustrating inter-eNB Carrier Aggregation.

In order to increase the transmission bandwidth, one user can be served by multiple cells, and the multiple cells can be covered by one eNB or multiple eNBs, the technique is referred to as Carrier Aggregation. FIG. 2 is a schematic diagram illustrating inter-eNB Carrier Aggregation. For a UE working in the case of the Carrier Aggregation, aggregated cells include a Primary Cell (PCell) and a Secondary Cell (SCell). PCell can be referred to as Serving Cell in the present application. There is only one PCell, and the PCell is always in an active state. The PCell can be handed over only through a handover process. The UE sends and receives Non-Access Stratum (NAS) information only in the PCell, and a Physical Uplink Control CHannel (PUCCH) can be sent only in the PCell.

According to different quality requirements, UE services can include a Guaranteed Bit Rate (GBR) service and a non-GBR service. For the GBR service, a certain transmission rate needs to be guaranteed. For non-GBR services of a user, an AMBR is defined, and the AMBR belongs to subscription information of the UE. Total rate of all non-GBR services cannot be greater than rate defined by AMBR. AMBR of a UE (UE-AMBR) set by the MME is set according to the subscription information of the UE, and cannot be greater than the AMBR value in the subscription information of the UE. There are UE-AMBR corresponding to uplink data and UE-AMBR corresponding to downlink data respectively. The MME sends a UE-AMBR to an eNB. The eNB has an uplink and a downlink scheduling function, with which, total rate of non-GBR services sent synchronously are not larger than the UE-AMBR. For example, suppose the uplink UE-AMBR is 10, and if there is data of two non-GBR services to be sent at certain moment, the rate of each non-GBR service schedulable by the eNB can be 5, if there is data of only one non-GBR service to be sent, the rate of the non-GBR service schedulable by the eNB can be 10.

The UE-AMBR is sent to the eNB by the MME when the UE enters the connection mode, and the MME establishes UE context at the eNB. The specific method includes: the MME sends the UE-AMBR carried in an "initial context set up request" message to the eNB; the eNB stories the UE-AMBR and uses the UE-AMBR in subsequent data scheduling. The current problem is as follows. When cells participating in Carrier Aggregation are covered by different eNBs (cells participating in Carrier Aggregation are controlled by different eNBs), multiple S1 bearers are established for the user between the SGW and the eNBs, non-GBR services of the UE can be established on different eNBs. Thus, current UE-AMBR cannot be applied to the case that one UE has multiple S1 bearers.

SUMMARY

To address the above-discussed deficiencies, it is a primary object to provide several methods for configuring UE-AMBR, so that total rate of all non-GBR services of a UE is not larger than rate defined by AMBR in subscription information when the UE has multiple S1 bearers.

Embodiments of the present application also provide a method for configuring UE-AMBR by the eNB covering the serving cell when non-GBR services of the UE are established on different eNBs and the UE has only one S1 bearer.

A method for configuring UE-AMBR provided by embodiments of the present application includes, sending, by a Mobility Management Entity (MME), the UE-AMBR to an eNB covering the serving cell of the UE, establishing, by the eNB covering the serving cell of the UE, a radio access bearer of the UE on at least one secondary cell, sending, by the MME, an AMBR used in the eNB covering the serving cell of the UE and an AMBR used in an secondary eNB covering a secondary cell of the UE to the eNB covering the serving cell of the UE, sending, by the eNB covering the serving cell of the UE, the AMBR used in the eNB covering the secondary cell of the UE to corresponding eNB.

In another example of the present application, establishing a radio bearer includes sending, by the eNB covering the serving cell of the UE, a secondary cell set up request message to an secondary eNB covering a secondary cell, in which the secondary cell set up request message includes an identity of a destination cell, an identity of the UE in a X2 interface, information of an E-RAB to be established; in which, information of the E-RAB includes an identity of the radio access bearer, service quality information of the radio access bearer, transport layer address and tunnel port identity of a Serving Gateway (SGW) or the primary eNB covering the serving cell of the UE for receiving uplink data, sending, by the eNB covering the secondary cell, a secondary cell set up response message to the primary eNB.

In another example of the present application, after step B), the method further includes: sending, by the primary eNB covering the serving cell of the UE, an initial context response message to the MME, in which the initial context response message includes an identity of the UE in a S1 interface, an identity of the successfully established radio access bearer, transport layer address and tunnel port identity of the eNB for receiving downlink data; the initial context response message further includes an identity of the eNB covering the secondary cell or an identity of the secondary cell.

In another example of the present application, sending the AMBR used in each eNB in step C) carried in a UE context modification request message or other message to the eNB covering the serving cell of the UE.

In another example of the present application, the UE context modification request message carries the identity of the primary eNB covering the serving cell of the UE, the AMBR of the UE in the eNB covering the serving cell of the UE, the identity of the eNB covering the secondary cell of the UE, the AMBR of the UE in the eNB covering the secondary cell of the UE, or the UE context modification request message carries: the identity of the eNB covering the secondary cell of the UE, the AMBR of the UE in the eNB covering the secondary cell of the UE, or the UE context modification request message carries: a AMBR sequence, wherein, the first AMBR in the AMBR sequence denotes the AMBR of the UE in the eNB covering the serving cell of the UE, the ith AMBR in the AMBR sequence denotes the AMBR of the UE in the eNB covering the (i−1)th secondary cell of the UE, i is an integer ranging from 2 to N, N is the total number of secondary cells.

A method for configuring UE-AMBR provided by embodiments of the present application includes A) sending, by a Mobility Management Entity, MME, the UE-AMBR to an eNB covering the serving cell of the UE, B) sending, by the eNB covering the serving cell of the UE, a request for establishing a radio access bearer of the UE on at least one secondary cell to the MME; establishing, by the MME, the radio access bearer of the UE on at least one secondary cell, and sending, by the MME, a AMBR used in the corresponding eNB covering a secondary cell to the corresponding eNB covering the secondary cell, C) sending, by the MME, an AMBR used in the eNB covering the serving cell of the UE carried in a UE context modification request message to the eNB covering the serving cell of the UE, D) sending, by the eNB covering the serving cell of the UE, a UE context modification response message to the MME.

In another example of the present application, sending, by the MME, the AMBR used in the corresponding eNB covering a secondary cell to the corresponding eNB covering the secondary cell comprises sending, by the MME, the AMBR used in the corresponding eNB covering a secondary cell carried in a secondary cell set up request message to the corresponding eNB covering the secondary cell.

A method for configuring UE-AMBR provided by embodiments of the present application includes A) sending, by a Mobility Management Entity, MME, the UE-AMBR to an eNB covering the serving cell of the UE, B) establishing, by the eNB covering the serving cell of the UE, a radio access bearer of the UE on at least one secondary cell; determining, by the eNB covering the serving cell of the UE, an AMBR used in an eNB covering a secondary cell, and sending, by the eNB covering the serving cell of the UE, the corresponding AMBR to the eNB covering the secondary cell.

In another example of the present application, sending, by the eNB covering the serving cell of the UE, the corresponding AMBR to the eNB covering the secondary cell comprises sending, by the eNB covering the serving cell of the UE, the corresponding AMBR carried in a secondary cell set up request message to the eNB covering the secondary cell.

A method for configuring UE-AMBR provided by embodiments of the present application includes, A) sending, by a Mobility Management Entity, MME, the UE-AMBR to an eNB covering the serving cell of the UE, B) sending, by the eNB covering the serving cell of the UE, a request for establishing a radio access bearer of the UE on at least one secondary cell to the MME, and sending, by the eNB covering the serving cell of the UE, an AMBR used in an eNB covering a secondary cell to the MME; establishing, by the MME, the radio access bearer of the UE on at least one secondary cell, and sending, by the MME, the AMBR used in the eNB covering a secondary cell to corresponding eNB covering the secondary cell.

In another example of the present application, sending, by the eNB covering the primary cell of the UE, the AMBR used in an eNB covering a secondary cell to the MME comprises sending, by the eNB covering the primary cell of the UE, the AMBR used in an eNB covering a secondary cell carried in a secondary cell set up request message to the MME.

A method for configuring UE-AMBR provided by embodiments of the present application includes receiving, by an eNB covering the serving cell of the UE, a LTE radio access bearer, E-RAB, set up request from a Mobility Management Entity (MME), establishing, by the eNB covering the serving cell of the UE, all non-Guaranteed Bit Rate (non-GBR) services on a first eNB, and sending, by the eNB covering the serving cell of the UE, a UE-AMBR to the first eNB.

As can be seen from the above technical solutions, the several methods for configuring UE-AMBR provided by the present application can make total rate of all non-GBR services of a UE be not larger than the UE-AMBR when the UE has multiple S1 bearers, or when the UE has only one S1 bearer, and non-GBR services of the UE are established on different eNBs, make total rate of all non-GBR services of a UE be not larger than rate defined by AMBR in subscription information. Thus requirements of subscription information may be satisfied, network congestion resulting from large data load of access network may be avoided, and network resources may be shared among services and relevant services may be achieved.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. In order to make objectives, technical solutions and advantages of the present application clearer, the present application will be described in detail hereinafter with reference to accompanying drawings.

The present application provides several methods for configuring UE-AMBR. By improving different network entities, the eNB of each cell participating in the Carrier Aggregation can obtain a corresponding AMBR. Thus total rate of all non-GBR services of a UE may be not larger than the UE-AMBR and relevant services can be achieved when the UE has multiple S1 bearers; or when the UE has only one S1 bearer, and non-GBR services of the UE are established on different eNBs, total rate of all non-GBR services of a UE may be not larger than rate defined by AMBR in subscription information. The present application will be described in detail hereinafter according to several preferable embodiments.

Figure 3:
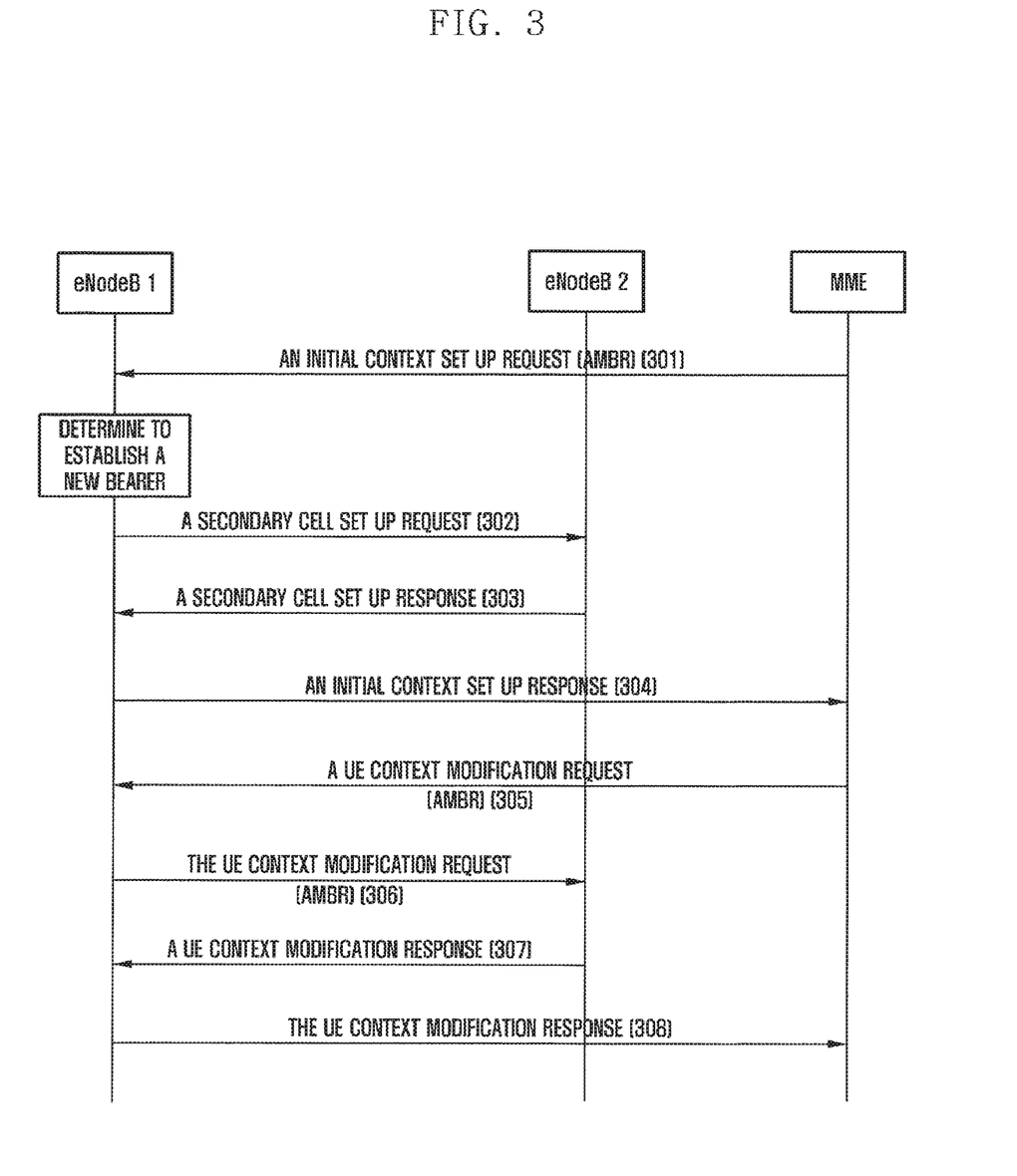
FIG. 3 is a flowchart illustrating a method for configuring UE-AMBR according to a first embodiment of the present application.

In the first embodiment, eNB 1 establishes a data bearer for a user on eNB 2, and a MME set a UE-MABR for the eNBs. The process for configuring UE-AMBR through an X2 interface between the two eNBs is shown in FIG. 3. ENB 1 is the eNB covering the serving cell of the user, namely, the eNB covering the primary cell of the user. ENB 2 provides the data bearer for the user, and receives downlink data from a SGW or eNB 1, and sends received data to the UE. There is an X2 interface between eNB 1 and eNB 2. In the first embodiment, the signaling interaction process between each eNB and the UE, and the signaling interaction process between the MME and the SGW is not described. The process shown in FIG. 3 can include the following processes.

Step 301, the MME sends an "initial context set up request" message to eNB 1.

The MME sends the intimal context set up request message to set up context information of the UE on eNB 1. Before step 301, the UE can send a request for establishing a RRC connection to the serving cell controlled by eNB 1, and this process is the same as current RRC establishment process. Besides, each eNB can send a first uplink S1 interface message, e.g. initial UE message, to the MME, this message is sent to the MME by the eNB covering the serving cell of the UE after the RRC connection is established, and this process is the same as that defined in current protocol.

The "initial context set up request" message includes an identity of the UE in the S1 interface, and the identity uniquely identifies the UE in the S1 interface. The "initial context set up request" message further includes a UE-AMBR. The "initial context set up request" message can further include capability information of the UE and information of a LTE radio access bearer (E-RAB) to be established. The E-RAB information includes an identity of the bearer, service quality information of the bearer, transport layer address and tunnel port identity of the SGW for receiving uplink data.

The message in step 301 also can be replaced by other message. For example, the MME sends an E-RAB set up request message when the UE enters connection mode, and the network establishes a new bearer for the UE. The E-RAB set up request message includes an identity of the UE in the S1 interface and the UE-AMBR. The E-RAB set up request message can further include capability information of the UE and information of a LTE radio access bearer (E-RAB) to be established. The E-RAB information includes an identity of the bearer, service quality information of the bearer, transport layer address and tunnel port identity of the SGW for receiving uplink data.

In step 302, eNB 1 sends eNB 2 a secondary cell set up request message for requesting eNB 2 to establish a new radio access bearer for the UE.

The serving cell of the UE determines to establish a radio access bearer on a secondary cell, and eNB 1 can select the secondary cell according to radio signal quality. Suppose the secondary cell is covered by eNB 2, then eNB 1 can send a message to eNB 2. Name of the message is not limited to "secondary cell set up request message", and can be other name. The message includes an identity of a destination cell (namely the secondary cell on which the radio access bearer to be established), an identity of the UE in the X2 interface, information of an E-RAB to be established. E-RAB information includes an identity of the radio access bearer, service quality information of the radio access bearer, transport layer address and tunnel port identity of the SGW (or eNB 1) for receiving uplink data.

In the embodiment, one eNB is taken as an example. If multiple secondary cells need to be established on different eNBs, step 302 can be performed repeatedly, that is, eNB 1 can send a message to multiple eNBs.

In step 303, eNB 2 sends a secondary cell set up response message to eNB 1. After determining the secondary cell is established successfully, eNB 2 sends the secondary cell set up response message to eNB 1. The secondary cell set up response message includes information of a secondary cell newly covered by eNB 2, transport layer address and tunnel port identity for receiving downlink data.

Information of the secondary cell can include a Physical-layer Cell Identity (PCI) of the secondary cell, a cell identity, a Public Land Mobile Network (PLMN) identity of the cell, uplink and downlink frequency and bandwidth of the cell, and can further includes the number of antenna ports, information of MBSFN subframe and configuration of the Physical Random Access Channel (PRACH). The information of the secondary cell can further include general configuration of the Physical Downlink Shared Channel (PDSCH) of the secondary cell, such as a reference signal power of the PDSCH and P-B. The information of the secondary cell can further include configuration of a Physical Hybrid ARQ Indicator Channel (PHICH), such as whether the duration of the PHICH is normal or extend, and PHICH resources. The information of the secondary cell can include all of or part of above information.

In step 304, eNB 1 sends an initial context set up response message to the MME. eNB 1 informs the MME that the UE context is established successfully, and informs the MME of information of the radio access bearer successfully established by the eNB. The initial context set up response message can include an identity of the UE in the S1 interface, an identity of the successfully established radio access bearer, transport layer address and tunnel port identity of the eNB for receiving downlink data. The initial context set up response message can further include an identity of eNB 2 (eNB Id) covering the secondary cell, or further include a cell identity (Cell Id) of the secondary cell. If secondary cells are established on multiple cells, the initial context set up response message can include identities of multiple eNBs.

After receiving the message of step 304, the MME can obtain the transport layer address and tunnel port identity for receiving downlink data, and can inform a gateway of the information in subsequent process for establishing a downlink data tunnel.

In step 305, the MME sends a UE context modification request message to eNB 1.

The MME informs eNB1 of the AMBR used in eNB1 and the AMBR used in eNB2, which can be achieved by carrying the corresponding AMBR of UE used in the eNB in the message in step 305. The name of the message may be not limited to "UE context modification request", and may be other name.

The first implementation mode includes the following: The message includes: an eNB Id of eNB 1, an AMBR of the UE used in eNB 1, an eNB Id of eNB 2, an AMBR of the UE used in eNB 2. Similarly, if there are more than two eNBs, the message can include eNB Ids and corresponding AMBRs of the eNBs. Since the message is sent to eNB 1, the eNB Id of eNB 1 can be omitted.

The second implementation mode includes the following: The message includes: an eNB Id of eNB 2, an AMBR of the UE used in eNB 2. Similarly, if there are more than two eNBs, the message can include eNB Ids and corresponding AMBRs of the eNBs. The AMBR used by eNB 1 is calculated by eNB 1 itself. The calculation method can be the following. The AMBR used by eNB 1 is the UE-AMBR, or the AMBR used by eNB 1 is calculated by subtracting the AMBR of the UE used in eNB 2 from the UE-AMBR.

The third implementation mode includes the following: The message includes: AMBR-1 and AMBR-2. AMBR-1 denotes the AMBR of the UE used in eNB 1, AMBR-2 denotes the AMBR of the UE used in eNB 2. Similarly, if there are more than two eNBs, the message can include corresponding AMBRs of the eNBs. The sequence of the AMBRs of the eNBs can be consistent with that of identities of eNBs covering the secondary cell reported in step 304.

The foregoing description of implementation modes is provided for illustrative purposes only, and does not limit the scope of the present disclosure.

It is noted that, if eNB 2 receives downlink data from the SGW, when configuring the UE-AMBR for eNB 1, the MME needs to consider the multiple S1 interfaces between the SGW and the eNBs. For example, the sum of AMBR-1 and AMBR-2 is not larger than the value of AMBR in subscription information of the UE.

Supposing that eNB 2 receives downlink data from eNB 1, and there is only one S1 interface between the SGW and the eNBs, the method for configuring the UE-AMBR for eNB 1 is the same as conventional configuration method. The MME can configure the UE-AMBR for eNB 2 with reference to subscription information, or according to pre-configured information, or with reference to load information of the eNB.

In step 306, eNB 1 sends a UE context modification request to eNB 2. eNB 1 informs eNB 2 of an AMBR of the UE used in eNB 2. The message can include an identity of the UE in the X2 interface and an AMBR of UE. In the embodiment, one eNB is taken as an example. If multiple secondary cells need to be established on different eNBs, step 306 can be performed repeatedly, that is, eNB 1 can send a message to multiple eNBs.

In step 307, eNB 2 sends a UE context modification response to eNB 1. eNB 2 informs eNB 1 that the UE context is modified successfully. The UE context modification response message includes the identity of the UE in the X2 interface.

In step 308, eNB 1 sends the UE context modification response to the MME. eNB 1 informs the MME that the UE context is modified successfully. The UE context modification response message includes the identity of the UE in the S1 interface. Then, the process of the first embodiment is terminated.

Figure 4:
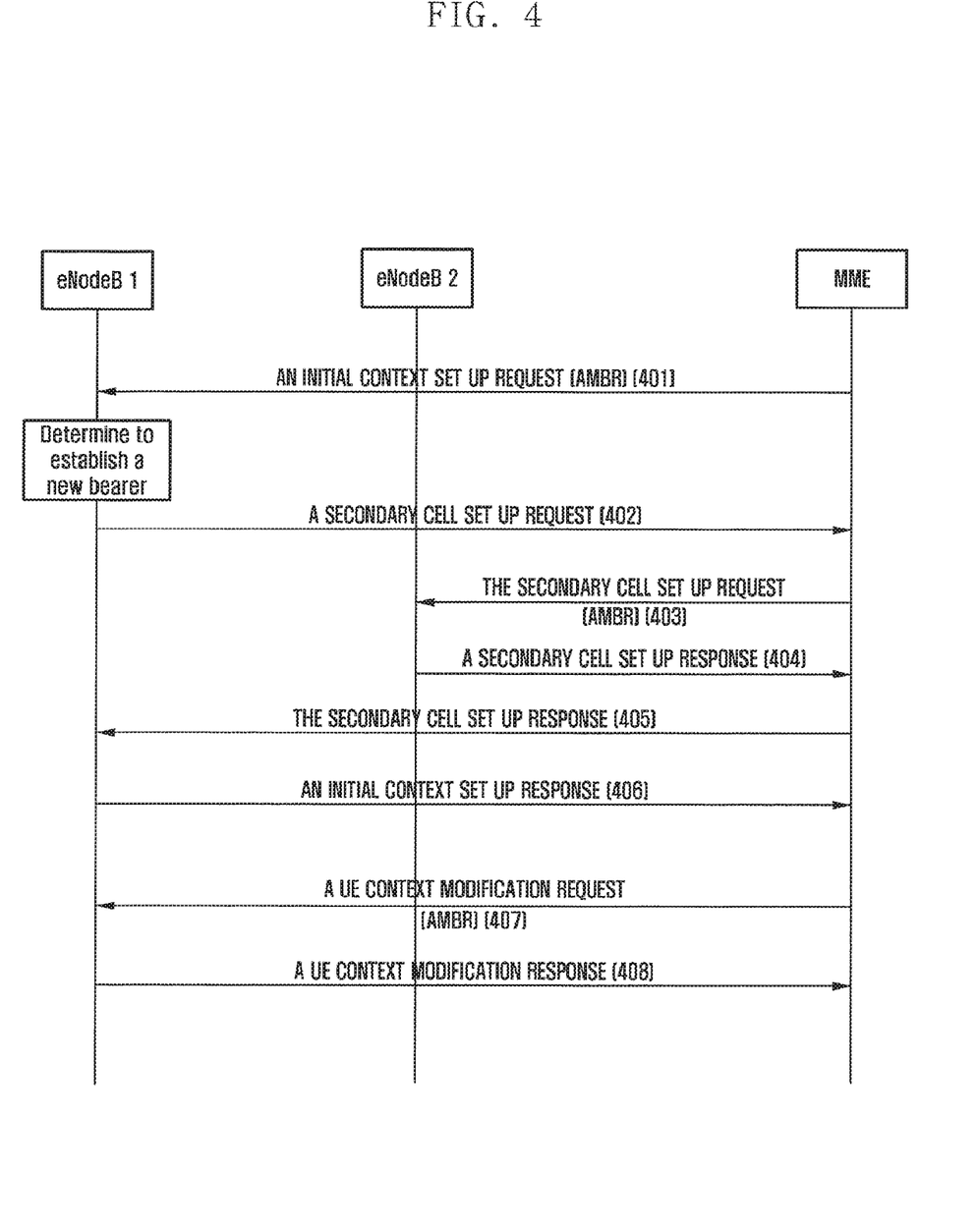
FIG. 4 is a flowchart illustrating a method for configuring UE-AMBR according to a second embodiment of the present application.

In the second embodiment, eNB 1 establishes a data bearer for a user on eNB 2, and a MME set a UE-MABR for the eNBs. The process for configuring UE-AMBR through an S1 interface is shown in FIG. 4. ENB 1 is the eNB covering the serving cell of the user, eNB 2 provides the data bearer for the user, and receives downlink data from a SGW or eNB 1, and sends received data to the UE. There is no X2 interface between eNB 1 and eNB 2. In the second embodiment, the signaling interaction process between each eNB and the UE, and the signaling interaction process between the MME and the SGW is not described. The process shown in FIG. 4 can include the following processes.

In step 401, the MME sends an "initial context set up request" message to eNB 1.

The MME sends the intimal context set up request message to set up context information of the UE on eNB 1. Before step 401, the UE can send a request for establishing a RRC connection to the serving cell covered by eNB 1, and this process is the same as current RRC establishment process. Besides, each eNB can send a first uplink S1 interface message, e.g. initial UE message, to the MME, this message is sent to the MME by the eNB covering the serving cell of the UE after the RRC connection is established, and this process is the same as that defined in current protocol.

The "initial context set up request" message includes an identity of the UE in the S1 interface, and the identity uniquely identifies the UE in the S1 interface. The "initial context set up request" message can further include a UE-AMBR. The "initial context set up request" message can further include capability information of the UE and information of an E-RAB to be established. The E-RAB information includes an identity of the radio access bearer, service quality information of the radio access bearer, transport layer address and tunnel port identity of the SGW for receiving uplink data.

In step 402, eNB 1 sends a secondary cell set up request message to the MME.

The serving cell of the UE determines to establish a radio access bearer on a secondary cell, and eNB 1 can select the secondary cell according to radio signal quality. Suppose the secondary cell is covered by eNB 2, since there is no X2 interface between eNB 1 and eNB 2, then eNB 1 can send a message to the MME. Name of the message is not limited to "secondary cell set up request message", and can be other name. The message includes an identity of a destination eNB and an identity of the UE in the S1 interface. The message can further include information of E-RAB to be established. E-RAB information includes an identity of the radio access bearer, service quality information of the radio access bearer, transport layer address and tunnel port identity of the SGW for receiving uplink data. Alternatively, the specific information of E-RAB may be not included in the message in step 402, and the message can only include an identity of the E-RAB. The specific information of E-RAB has been stored in the MME.

In step 403, the MME sends a secondary cell set up request message to eNB 2 for requesting eNB 2 to establish a new radio access bearer for the UE.

The message includes an identity of a destination cell, the identity of the UE in the S1 interface, and information of the E-RAB to be established. E-RAB information includes an identity of the radio access bearer, service quality information of the radio access bearer, transport layer address and tunnel port identity of the SGW for receiving uplink data. The message can further include an AMBR of the UE used in eNB 2.

In step 404, eNB 2 sends a secondary cell set up response message to the MME.

After determining the secondary cell is established successfully, eNB 2 sends the secondary cell set up response message to eNB 1. The secondary cell set up response message includes information of a secondary cell newly covered by eNB 2, transport layer address and tunnel port identity for receiving downlink data. The transmission of the information can be transparent to the MME, that is, the MME does not analyze the specific content, and send the information to eNB 1 through a container transmission method. If the transmission of the information is not transparent to the MME, the MME can obtain the transport layer address and tunnel port identity of the SGW for receiving downlink data, and can inform the gateway of the information in subsequent process for establishing a downlink data tunnel.

Since the specific information of the secondary cell can be the same as that mentioned in step 303, no further descriptions will be given here.

In step 405, the MME sends a secondary cell set up response message to eNB 1.

In step 406, eNB 1 sends an initial context set up response message to the MME.

eNB 1 informs the MME that the UE context is established successfully. If the transparent transmission mode is adopted in step 404, in step 406, eNB 1 informs the MME of information of the radio access bearer successfully established by the eNB. The initial context set up response message can include an identity of the UE in the S1 interface, an identity of the successfully established radio access bearer, transport layer address and tunnel port identity for receiving downlink data.

After receiving the message in step 406, the MME obtains transport layer address and tunnel port identity of for receiving downlink data, and can inform the gateway of the information in subsequent process for establishing a downlink data tunnel.

In step 407, the MME sends a UE context modification request message to eNB 1. The MME informs eNB 1 of a new AMBR of the UE used in eNB 1.

In step 408, eNB 1 sends a UE context modification response to the MME. eNB 1 informs the MME that the UE context is modified successfully. The UE context modification response message includes the identity of the UE in the S1 interface. Then, the process of the second embodiment is terminated.

Figure 5:
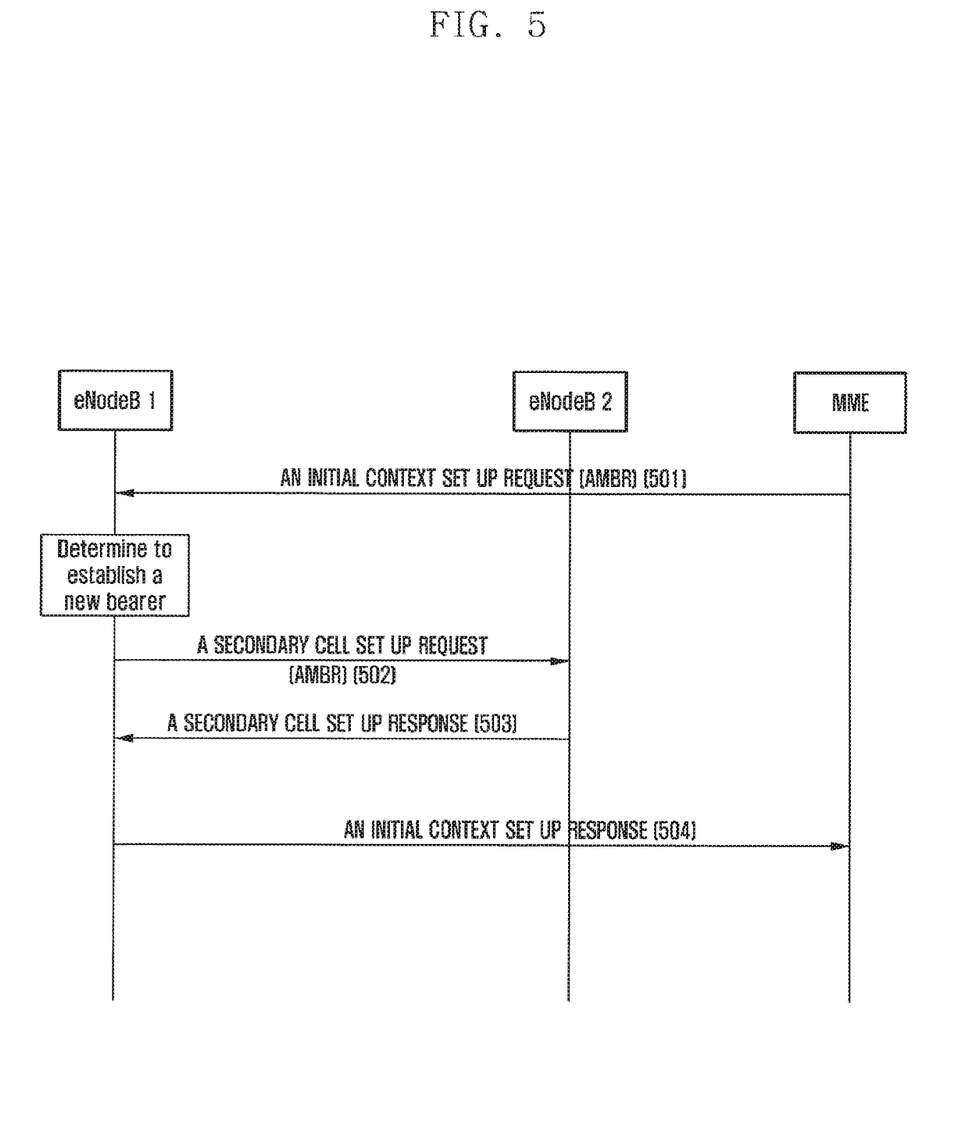
FIG. 5 is a flowchart illustrating a method for configuring UE-AMBR according to a third embodiment of the present application.

In the third embodiment, eNB 1 establishes a data bearer for a user on eNB 2. The process for configuring UE-AMBR for eNB 2 by eNB 1 through an X2 interface is shown in FIG. 5. ENB 1 is the eNB covering the serving cell of the user, eNB 2 provides the data bearer for the user, and receives downlink data from a SGW or eNB 1, and sends received data to the UE. There is an X2 interface between eNB 1 and eNB 2. In the third embodiment, the signaling interaction process between each eNB and the UE, and the signaling interaction process between the MME and the SGW is not described. The process shown in FIG. 5 can include the following processes.

In step 501, the MME sends an "initial context set up request" message to eNB 1.

The MME sends the intimal context set up request message to set up context information of the UE on eNB 1. Before step 501, the UE can send a request for establishing a RRC connection to the serving cell covered by eNB 1, and this process is the same as current RRC establishment process. Besides, each eNB can send a first uplink S1 interface message, e.g. initial UE message, to the MME, this message is sent to the MME by the eNB covering the serving cell of the UE after the RRC connection is established, and this process is the same as that defined in current protocol.

The "initial context set up request" message includes an identity of the UE in the S1 interface, and the identity uniquely identifies the UE in the S1 interface. The "initial context set up request" message further includes a UE-AMBR. The "initial context set up request" message can further include capability information of the UE and information of an E-RAB to be established. The E-RAB information includes an identity of the radio access bearer, service quality information of the radio access bearer, transport layer address and tunnel port identity of the SGW for receiving uplink data.

The message in step 501 also can be replaced by other message. For example, the MME sends an E-RAB set up request message when the UE enters connection mode, and the network establishes a new radio access bearer for the UE. The E-RAB set up request message includes an identity of the UE in the S1 interface and the UE-AMBR. The E-RAB set up request message can further include capability information of the UE and information of the E-RAB to be established. The E-RAB information includes an identity of the radio access bearer, service quality information of the radio access bearer, transport layer address and tunnel port identity of the SGW for receiving uplink data.

In step 502, eNB 1 sends eNB 2 a secondary cell set up request message for requesting eNB 2 to establish a new bearer for the UE.

The serving cell of the UE determines to establish a radio access bearer on a secondary cell, and eNB 1 can select the secondary cell according to radio signal quality. Suppose the secondary cell is covered by eNB 2, and eNB 1 determines the AMBR of the UE in eNB 2 and sends a message to eNB 2. The message includes an identity of a destination cell, an identity of the UE in the X2 interface, the AMBR of the UE used in eNB 2, and information of the E-RAB to be established. E-RAB information includes an identity of the radio access bearer, service quality information of the radio access bearer, transport layer address and tunnel port identity for receiving uplink data. The transport layer address for receiving uplink data can be an address of the gateway, or a transport layer address of a subscriber plane of eNB 1.

In the embodiment, one eNB is taken as an example. If multiple secondary cells need to be established on different eNBs, step 502 can be performed repeatedly, that is, eNB 1 can send a message to multiple eNBs.

In step 503, eNB 2 sends a secondary cell set up response message to eNB 1.

After determining the secondary cell is established successfully, eNB 2 sends the secondary cell set up response message to eNB 1. The secondary cell set up response message includes information of a secondary cell newly covered by eNB 2, transport layer address and tunnel port identity for receiving downlink data.

Information of the secondary cell can be the same as that described in step 303, and no further descriptions will be given here.

In step 504, eNB 1 sends an initial context set up response message to the MME.

ENB 1 informs the MME that the UE context is established successfully, and informs the MME of information of the radio access bearer successfully established by the eNB. The initial context set up response message can include an identity of the UE in the S1 interface, an identity of the successfully established radio access bearer, transport layer address and tunnel port identity of the eNB for receiving downlink data.

After receiving the message of step 504, the MME can obtain the transport layer address and tunnel port identity for receiving downlink data, and can inform a gateway of the information in subsequent process for establishing a downlink data tunnel. Then, the process of the third embodiment is terminated.

Figure 6:
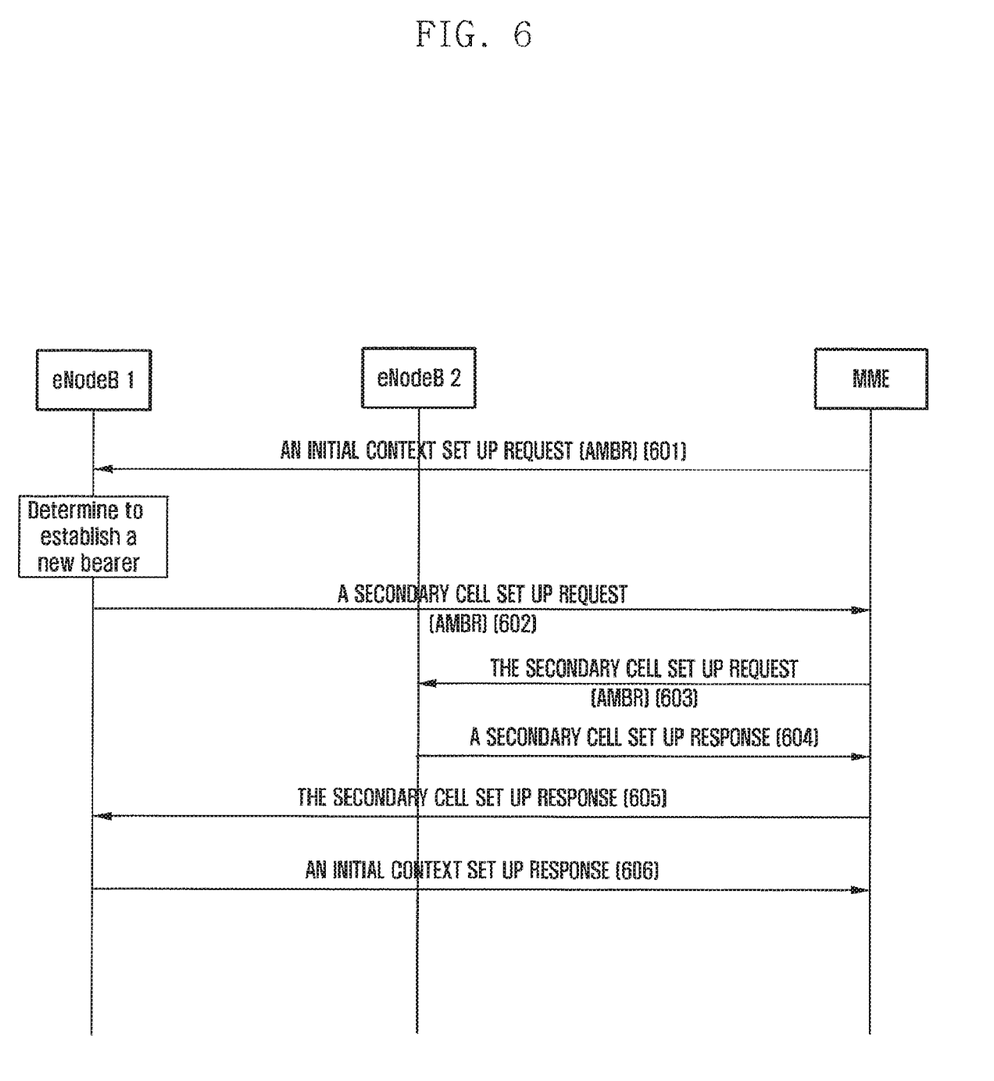
FIG. 6 is a flowchart illustrating a method for configuring UE-AMBR according to a four embodiment of the present application.

In the fourth embodiment, eNB 1 establishes a data bearer for a user on eNB 2. The process for configuring UE-AMBR for each eNB by eNB 1 is shown in FIG. 6. ENB 1 is the eNB covering the serving cell of the user, eNB 2 provides the data bearer for the user, and receives downlink data from a SGW or eNB 1, and sends received data to the UE. There is no X2 interface between eNB 1 and eNB 2. In the fourth embodiment, the signaling interaction process between each eNB and the UE, and the signaling interaction process between the MME and the SGW is not described. The process shown in FIG. 6 can include the following processes.

In step 601, the MME sends an "initial context set up request" message to eNB 1. The specific implement of step 601 is the same as that of step 401, no further descriptions will be given here.

In step 602, eNB 1 sends a secondary cell set up request message to the MME. The serving cell of the UE determines to establish a radio access bearer on a secondary cell, and eNB 1 can select the secondary cell according to radio signal quality. Suppose the secondary cell is covered by eNB 2, since there is no X2 interface between eNB 1 and eNB 2, then eNB 1 can send a message to the MME. The message includes an identity of a destination eNB and an identity of the UE in the S1 interface. The message can further include an AMBR of the UE in the destination eNB. Similarly to step 402, the message can further include or not include specific information of E-RAB to be established.

In step 603, the MME sends a secondary cell set up request message to eNB 2 for requesting eNB 2 to establish a new radio access bearer for the UE. The message includes an identity of a destination cell, the identity of the UE in the S1 interface, and information of the E-RAB to be established. E-RAB information includes an identity of the radio access bearer, service quality information of the radio access bearer, transport layer address and tunnel port identity of the SGW for receiving uplink data. The message can further include an AMBR of the UE used in eNB 2.

In step 604, eNB 2 sends a secondary cell set up response message to the MME. After determining the secondary cell is established successfully, eNB 2 sends the secondary cell set up response message to eNB 1. The secondary cell set up response message includes information of a secondary cell newly covered by eNB 2, transport layer address and tunnel port identity for receiving downlink data. The transmission of the information can be transparent to the MME, that is, the MME does not analyze the specific content, and send the information to eNB 1 through a container transmission method. If the transmission of the information is not transparent to the MME, the MME can obtain the transport layer address and tunnel port identity of the SGW for receiving downlink data, and can inform the gateway of the information in subsequent process for establishing a downlink data tunnel.

The specific information of the secondary cell can be the same as that mentioned in step 404, and no further descriptions will be given here.

In step 605, the MME sends a secondary cell set up response message to eNB 1.

In step 606, eNB 1 sends an initial context set up response message to the MME.

eNB 1 informs the MME that the UE context is established successfully. Similarly to step 406, eNB 1 can inform the MME of information of the radio access bearer successfully established by the eNB. The initial context set up response message can include an identity of the UE in the S1 interface, an identity of the successfully established radio access bearer, transport layer address and tunnel port identity for receiving downlink data.

After receiving the message in step 606, the MME can obtain transport layer address and tunnel port identity of for receiving downlink data, and can inform the gateway of the information in subsequent process for establishing a downlink data tunnel.

Figure 7:
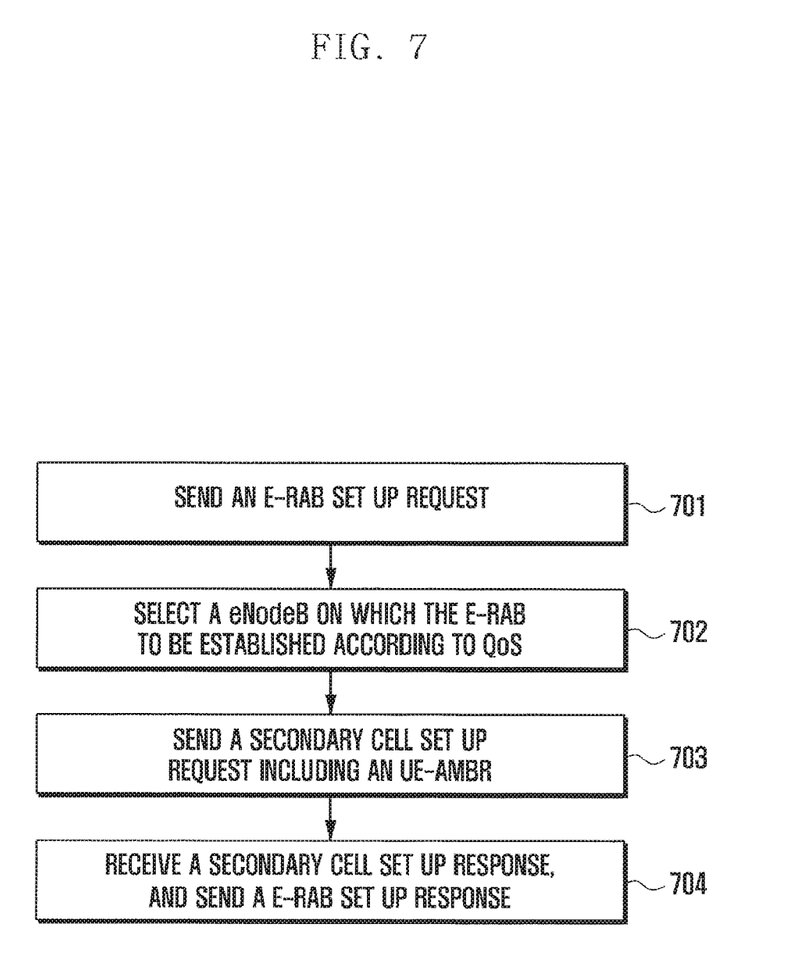
FIG. 7 is a flowchart illustrating a method for configuring UE-AMBR according to a five embodiment of the present application.

In the fifth embodiment, when establishing an E-RAB, eNB 1 establishes all non-GBR services on one eNB according to QoS information of the E-RAB, and then sends the UE-AMBR to the eNB. The method does not need to change the UE-AMBR configuration method, which can simply operations of the MME and the eNB. FIG. 7 is a flowchart illustrating a method for configuring UE-AMBR according to a five embodiment of the present application. As shown in FIG. 7, the method can include the following processes.

In step 701, eNB 1 receives an E-RAB set up request from the MME. The E-RAB set up request message can be the message mentioned in step 401, no further descriptions will be given here.

In step 702, eNB 1 determines to establish a secondary cell. It is determined on which eNB the secondary cell is established according to quality of signal of each cell, and QoS requirement of the E-RAB. According to QoS information, eNB 1 may establish non-GBR services on the same eNB. For instance, in the fifth embodiment, non-GBR services are established on eNB 2.

In step 703, eNB 1 sends a secondary cell set up request message to eNB 2 for requesting eNB 2 to establish a new radio access bearer for the UE.

The message includes an identity of a destination cell, an identity of the UE in the X2 interface and A UE-AMBR. The message may further include information of the E-RAB to be established.

In step 704, eNB 1 receives a secondary cell set up response message, the E-RAB is established successfully, eNB 1 sends a E-RAB set up response message to the MME.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by a first base station in a communication system, the method comprising:
   receiving, from an entity for managing mobility of a user equipment (UE), an initial context setup request message including a total aggregate maximum bit rate (AMBR) of the UE (UE-AMBR);
   determining a first base station UE-AMBR and a second base station UE-AMBR based on the total UE-AMBR;
   transmitting, to a second base station, a request message for dual connectivity, the request message including the second base station UE-AMBR and information on a radio access bearer to be established; and
   receiving, from the second base station, a response message in response to the request message,
   wherein the first base station UE-AMBR and the second base station UE-AMBR are enforced by the first base station and the second base station, respectively.

2. The method of claim 1, wherein the request message further includes at least one of an UE identifier associated with an interface between the first base station and the second base station, an identifier of the radio access bearer, information on quality of service for the radio access bearer, information on a transport layer address for an uplink, or information on a tunnel identifier for the uplink.

3. The method of claim 1, wherein the response message includes information on a transport layer for a downlink and a tunnel identifier for the downlink.

4. The method of claim 1, wherein each UE-AMBR includes an uplink UE-AMBR and a downlink UE AMBR.

5. The method of claim 1, wherein the total UE-AMBR is split into the first base station UE-AMBR and the second base station UE-AMBR.

6. A method performed by a second base station in a communication system, the method comprising:
   receiving, from a first base station, a request message for dual connectivity, the request message including information on a radio access bearer to be established; and
   transmitting, to the first base station, a response message in response to the request message,
   wherein an initial context setup request message including a total aggregate maximum bit rate (AMBR) of a user equipment (UE) (UE-AMBR) is transmitted from an entity for managing mobility of the UE to the first base station,
   wherein the request message further includes a second base station UE-AMBR,
   wherein a first base station UE-AMBR and the second base station UE-AMBR are determined by the first base station based on the total UE-AMBR, and
   wherein the first base station UE-AMBR and the second base station UE-AMBR are enforced by the first base station and the second base station, respectively.

7. The method of claim 6, wherein the request message further includes at least one of an UE identifier associated with an interface between the first base station and the second base station, an identifier of the radio access bearer, information on quality of service for the radio access bearer, information on a transport layer address for an uplink, or information on a tunnel identifier for the uplink.

8. The method of claim 6, wherein the response message includes information on a transport layer for a downlink and a tunnel identifier for the downlink.

9. The method of claim 6, wherein each UE-AMBR includes an uplink UE-AMBR and a downlink UE AMBR.

10. The method of claim 6, wherein the total UE-AMBR is split into the first base station UE-AMBR and the second base station UE-AMBR.

11. A first base station in a communication system, the first base station comprising:
   a transceiver; and
   a controller configured to:
      control the transceiver to receive, from an entity for managing mobility of a user equipment (UE), an initial context setup request message including a total aggregate maximum bit rate (AMBR) of the UE (UE-AMBR);
      determine a first base station UE-AMBR and a second base station UE-AMBR based on the total UE-AMBR;
      control the transceiver to transmit, to a second base station, a request message for dual connectivity, the request message including the second base station UE-AMBR, and information on a radio access bearer to be established; and
      control the transceiver to receive, from the second base station, a response message in response to the request message,
   wherein the first base station UE-AMBR and the second base station UE-AMBR are enforced by the first base station and the second base station, respectively.

12. The first base station of claim 11, wherein the request message further includes at least one of an UE identifier associated with an interface between the first base station and the second base station, an identifier of the radio access bearer, information on quality of service for the radio access bearer, information on a transport layer address for an uplink, or information on a tunnel identifier for the uplink.

13. The first base station of claim 11, wherein the response message includes information on a transport layer for a downlink and a tunnel identifier for the downlink.

14. The first base station of claim 11, wherein each UE-AMBR includes an uplink UE-AMBR and a downlink UE AMBR.

15. The first base station of claim 11, wherein the total UE-AMBR is split into the first base station UE-AMBR and the second base station UE-AMBR.

16. A second base station in a communication system, the second base station comprising:
    a transceiver; and
    a controller configured to:
    control the transceiver to receive, from a first base station, a request message for dual connectivity, the request message including information on a radio access bearer to be established; and
    control the transceiver to transmit, to the first base station, a response message in response to the request message,
    wherein an initial context setup request message including a total aggregate maximum bit rate (AMBR) of a user equipment (UE) (UE-AMBR) is transmitted from an entity for managing mobility of the UE to the first base station,
    wherein the request message further includes a second base station UE-AMBR,
    wherein a first base station UE-AMBR and the second base station UE-AMBR are determined by the first base station based on the total UE-AMBR, and
    wherein the first base station UE-AMBR and the second base station UE-AMBR are enforced by the first base station and the second base station, respectively.

17. The second base station of claim 16, wherein the request message further includes at least one of an UE identifier associated with an interface between the first base station and the second base station, an identifier of the radio access bearer, information on quality of service for the radio access bearer, information on a transport layer address for an uplink, or information on a tunnel identifier for the uplink.

18. The second base station of claim 16, wherein the response message includes information on a transport layer for a downlink and a tunnel identifier for the downlink.

19. The second base station of claim 16, wherein each UE-AMBR includes an uplink UE-AMBR and a downlink UE AMBR.

20. The second base station of claim 16, wherein the total UE-AMBR is split into the first base station UE-AMBR and the second base station UE-AMBR.

21. A method in a communication system which comprises an entity for managing mobility of a user equipment (UE), a first base station, and a second base station, the method comprising:
    identifying, by the entity, a total aggregate maximum bit rate (AMBR) of the UE (UE-AMBR) based on a subscribed UE-AMBR;
    transmitting, by the entity to the first base station, an initial context setup request message including the total UE-AMBR;
    determining, by the first base station, a first base station UE-AMBR and a second base station UE-AMBR based on the total UE-AMBR;
    transmitting, by the first base station to a second base station, a request message for dual connectivity, the request message including the second base station UE-AMBR and information on a radio access bearer to be established; and
    transmitting, by the second base station to the first base station, a response message in response to the request message,
    wherein the first base station UE-AMBR and the second base station UE-AMBR are enforced by the first base station and the second base station, respectively.

22. The method of claim 21,
    wherein the request message further includes at least one of an UE identifier associated with an interface between the first base station and the second base station, an identifier of the radio access bearer, information on quality of service for the radio access bearer, information on a transport layer address for an uplink, or information on a tunnel identifier for the uplink, and
    wherein the response message includes information on a transport layer for a downlink and a tunnel identifier for the downlink.

23. The method of claim 22, further comprising:
    transmitting, by the first base station to the entity, a message including the information on the transport layer for the downlink and the tunnel identifier for the downlink.

24. The method of claim 21,
    wherein each UE-AMBR includes an uplink UE-AMBR and a downlink UE AMBR, and
    wherein the total UE-AMBR is split into the first base station UE-AMBR and the second base station UE-AMBR.

25. A communication system comprising:
    an entity for managing mobility of a user equipment (UE) configured to identify a total aggregate maximum bit rate (AMBR) of the UE (UE-AMBR) based on a subscribed UE-AMBR, and transmit, to a first base station, an initial context setup request message including the total UE-AMBR;
    the first base station configured to determine a first base station UE-AMBR and a second base station UE-AMBR based on the total UE-AMBR, and transmit, to a second base station, a request message for dual connectivity, wherein the request message includes the second base station UE-AMBR and information on a radio access bearer to be established; and
    the second base station configured to transmit, to the first base station, a response message in response to the request message,
    wherein the first base station UE-AMBR and the second base station UE-AMBR are enforced by the first base station and the second base station, respectively.

26. The communication system of claim 25,
    wherein the request message further includes at least one of an UE identifier associated with an interface between the first base station and the second base station, an identifier of the radio access bearer, information on quality of service for the radio access bearer, information on a transport layer address for an uplink, or information on a tunnel identifier for the uplink, and
    wherein the response message includes information on a transport layer for a downlink and a tunnel identifier for the downlink.

27. The communication system of claim 26, wherein the first base station is further configured to transmit, to the entity, a message including the information on the transport layer for the downlink and the tunnel identifier for the downlink.

28. The communication system of claim 25,
wherein each UE-AMBR includes an uplink UE-AMBR and a downlink UE AMBR, and
wherein the total UE-AMBR is split into the first base station UE-AMBR and the second base station UE-AMBR.

* * * * *